United States Patent [19]

Beck

[11] 4,115,930
[45] Sep. 26, 1978

[54] EDUCATIONAL TEACHING DEVICE

[76] Inventor: Charles R. Beck, 4432 Laurel Grove, Studio City, Calif. 90048

[21] Appl. No.: 755,227

[22] Filed: Dec. 29, 1976

[51] Int. Cl.² .................................................. G09B 29/00
[52] U.S. Cl. .......................................... 35/7 R; 35/73
[58] Field of Search ............. 35/7 R, 7 A, 9 R, 31 F, 35/35 D, 35 H, 35 J, 73

[56] References Cited

U.S. PATENT DOCUMENTS

| 2,581,595 | 1/1952 | Mioduski | 35/73 |
| 2,853,803 | 9/1958 | Exton | 35/73 X |
| 3,496,653 | 2/1970 | Wolfner | 35/73 |

FOREIGN PATENT DOCUMENTS 831,817  6/1938  France .................................... 35/35 J

OTHER PUBLICATIONS

Cleo Learning Aids Catalog, pp. 95, 148, 151, prior to Feb. 28, 1976.
Stoelting Co. Catalog, pp. 56, 57 only, Aug. 1930, 19202 Dexterity test.

Primary Examiner—Harland S. Skogquist
Attorney, Agent, or Firm—John J. Posta, Jr.

[57] ABSTRACT

An improved teaching device for use in imparting education to students comprises a teaching display board having a flat, curved, globular or other shape of extended surface area, at least one set of related units of informational material, such as pictures of birds, animals or the like and means for releasably securing them to the board.

The device further includes a set of related indicia-bearing captions for each set of units of informational material, and means for releasably fixing the captions to the board adjacent the informational material. Each caption also bears at least one physical key for proper correlation of that caption with a single one of the informational units. Such key may be, for example, the length, shape, size, color, smell or the like of the caption relative to the particular informational unit.

Each caption and/or informational unit may also bear a second physical key indicating the inherent degree of difficulty of correlating said captions with said informational units.

16 Claims, 3 Drawing Figures

EDUCATIONAL TEACHING DEVICE

BACKGROUND OF THE INVENTION

1. Field of the Invention

The present invention generally relates to information-imparting devices and more particularly to a novel educational teaching device capable of stimulating and sustaining student interest and rapid learning.

Prior Art

Conventional types of teaching including oral teacher instruction combined with student book work have been found to be sadly lacking in results, at least with a certain substantial percentage of students. The problem is now recognized as being one of lack of student motivation and interest. It is believed by many educators that almost any normally mentally endowed student can absorb and retain even surprisingly difficult information if that student is sufficiently strongly motivated. The difficulty has been to devise ways of creating and sustaining that student motivation during the learning process while still providing the teacher with sufficient latitude to adapt his or her style to the needs of the class and to the curriculum requirements, all within the stringent limitations of school budgets.

Thus, certain devices, such as slide and movie projection systems, have been found to be useful auxiliary aids, but are limited in adaptability and are inherently expensive and cumbersome. Field trips are also useful, but again are expensive, difficult to effectively organize, and, moreover, consume substantial amounts of school time.

There still remains a need for an inexpensive, simple, highly adaptable and compact teaching system for stimulating student interest and improving student retention of all levels of knowledge.

SUMMARY OF THE INVENTION

The foregoing needs have now been satisfied by the improved educational teaching device of the present invention. The improved device is substantially as set forth in the Abstract above.

Thus, it comprises a teaching display board of extended surface area, one or more sets of related units of informational material, and one or more sets of indicia-bearing captions for the informational units. Moreover, the captions bear at least one physical key to help the students to correlate the individual captions with the individual informational units.

Additional physical keys can be provided on the captions, informational units and/or instruction sheets (provided as part of the device) to indicate the degree of difficulty for the students in making the necessary correlations.

The teaching device is compact, inexpensive, simple and highly adaptable for use in a variety of modes and in the imparting of a wide range of information. Further features are set forth in the following detailed description and accompanying drawings.

DRAWINGS

FIG. 1 is a schematic front elevation of a first preferred embodiment of the improved educational teaching device of the present invention, showing a plurality of specially shaped informational pictures in place over designated locations of a flat rectangular display board, and with matching captions of equal length secured under the pictures on the board;

FIG. 2 is a schematic front elevation of a second preferred embodiment of the improved educational teaching device of the present invention, showing a flat circular display board divided into a plurality of color coded pie-shaped segments, each releasably bearing on the surface thereof pie-shaped informational units to which are releasably secured color coded caption tabs; and, FIG. 3 schematically depicts in front elevation a third preferred embodiment of the improved educational teaching device of the present invention, in the form of an internally lighted terrestrial globe having a plurality of colored transparent glass windows over which are releasably fixed translucent informational decals, and below which are releasably secured related indicia-bearing captions, said globe including a stand bearing a plurality of instruction sheets for use of said device.

DETAILED DESCRIPTION

FIG. 1

Figure 1:
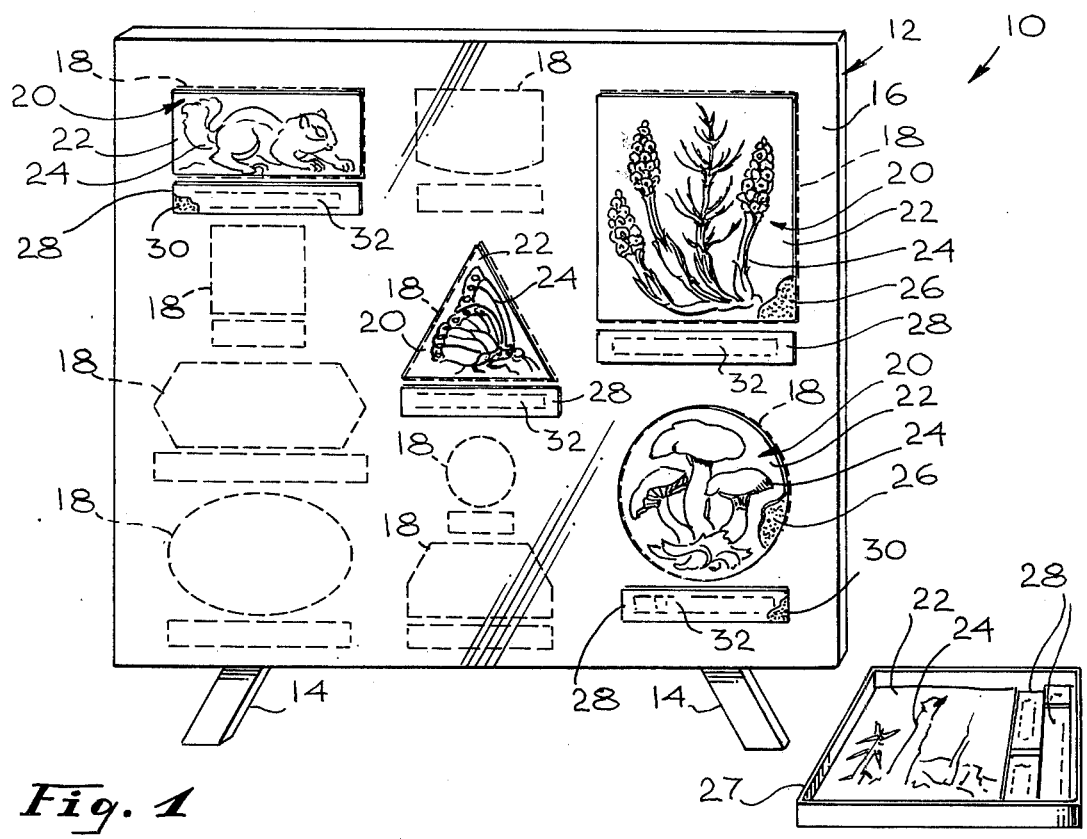

Now referring more particularly to FIG. 1 of the drawings, a first preferred embodiment of the invention is schematically depicted therein. Thus, an educational teaching device 10 is shown which includes a flat rectangular display board 12 supported in an upright position by a stand 14 and bearing on its front face 16 a spaced plurality of shapes 18 in dotted outline.

Each shape 18 is different both in configuration and the length of its maximum dimension. The configuration of each dotted outline 18 acts as a physical key to enable a teacher or student to properly place particular informational units 20 in their proper place on board 12, that is, on the particular outlines 18 of the same size and shape, all as shown in FIG. 1.

Thus, a set of related units 20 is provided, each unit 20 comprising a sheet 22 bearing indicia 24 in the form of a picture of a particular animal, mountain, tree, grain field, or the like. Sheets 22 are releasably secured to board 12 over outlines 18 by an adhesive backing 26 or by any other equivalent type of releasable fastening means. The first step in an educational process, utilizing device 10, particularly for students of tender years, is to study and then place pictures 24 in the proper locations on board 12 via matching outlines 18.

As a second step in the educational process, the student or students then remove and place additional sheets 22 bearing pictures 24, one for each outline 18, which can be taken from a container such as box 27, shown in FIG. 1, and used in this step until outlines 18 on board 12 are covered. The students then remove a set of related indicia-bearing captions 28, from box 27, each caption 28 relating to a different one of the pictures 24, and releasably affix the captions 28 as by an adhesive backing 30, or other similar means at locations below or otherwise adjacent to the properly related pictures 24 on board 12.

Indicia 32 on the captions 28 relate to the picture 24 and describe, amplify and further impart knowledge to the students concerning the pictures, thus stimulating student interest.

In order to aid the student in carrying out this second step, each caption 28 is provided with at least one physical key, other than the indicia 32, which key relates it in some manner to the proper picture 24. In this instance, the physical key is the length of each caption 28. Thus, as shown in FIG. 1, each caption 28 has a length which exactly equals the largest horizontal dimension of only one of the pictures 24, that is, the picture 24 to which it correctly relates, as per the indicia 32 on that caption 28. The students can be left to discover this new relationship as an added test of skill, or can be told this relationship by the teacher and then allowed to apply it whenever necessary in order to complete the task of properly affixing captions 28 adjacent the proper pictures 24. It will be understood that the physical key referred to above could be one of size, shape, color, smell, texture or the like in place of the linear dimension described.

If desired, several of the units 20 can have identical lengths with as associated set of captions 28 having identical lengths. The aforesaid key (length) would enable a student to segregate a set of captions 28 of a given length and relate it to a set of units 20 having the same length as a first step. A further learning step would be provided in causing the student to relate a specific caption 28 to a specific unit 20 by inter-relating the information on indicia 32 to the picture 24 on a given unit 20.

The students are then asked to read and discuss the pictures and captions after the task of applying captions 28 is over. The described steps in the teaching process are different, new, interest catching, stimulating and rewarding. They result in rapid, easy learning with good knowledge retention. They provide a proper balance between the development of mechanical skills (the acts of affixing and aligning captions 28 and pictures 24), the exercise of mental skills (ascertaining hidden keys and making use of them), and the acquisition of knowledge (absorbing the content of informational sheets 22 and captions 28).

Device 10 is simple, inexpensive and easily adapted to classroom curricula and routines.

It can be made of any suitable materials, such as plastic, metal, wood, cellulose material such as fiberboard, cardboard (with photographs pasted thereto in the case of sheets 22, etc.) or the like, and can even become the subject of a classroom project.

Pictures 24 can be varied with other informational units 20, such as graphs, charts, scales of musical notes, words, phrases, etc. Moreover, captions 28 can be varied in indicia 32, etc., as desired and as needed. The manner described above for the use of device 10 can also be varied as desired, in order to sustain student interest and stimulate learning. For example, all students can participate in placing both pictures 24 and captions 28. Captions 28 can, if desired, be placed around the periphery of board 12, and the indicia 32 thereon read aloud, and then the pictures 24 can be drawn one by one. The class can decide as a whole where each picture 24 should go and with which caption 28.

A question and answer and/or instruction sheet (not shown) can also be provided the teacher and students in order to maximize the benefits from proper use of device 10 and to suggest alternate systems of use. Device 10 thus promotes learning in a new, effective and interesting way.

FIG. 2

Figure 2:
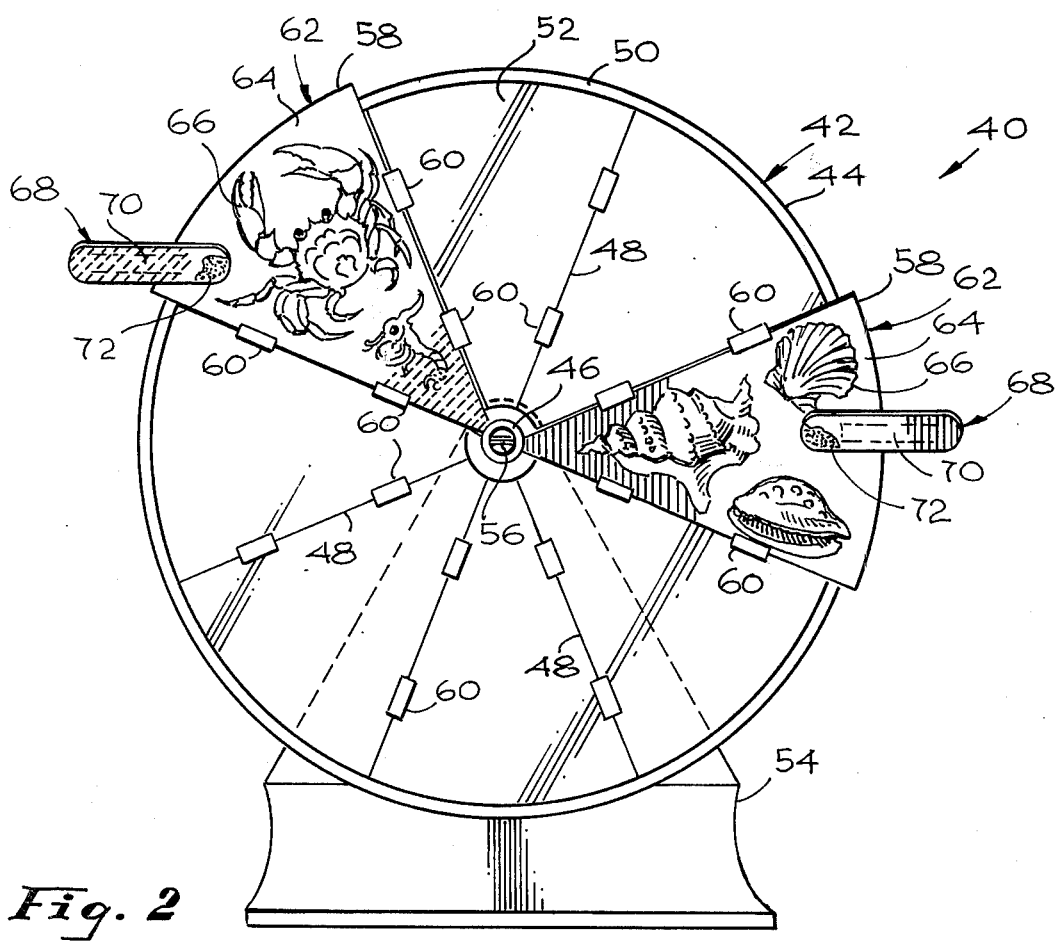

A second embodiment of the invention is depicted schematically in FIG. 2. Thus, in FIG. 2, a device 40 is shown, which includes a display board 42 in the form of a wheel 44 having a central hub 46 with radiating spokes 48 and peripheral rim 50. A backing sheet 52 is secured to the rear of wheel 44 and is coextensive therewith.

Wheel 44 is connected to a stand 54 by a bar 56 through hub 46 so that wheel 44 can turn, that is, rotate. Wheel 44 and sheet 52 and stand 54 can be made of any suitable material, such as that used in device 10, as can pie-shaped flat segments 58 which releasably fit between adjacent spokes 48, and over sheet 52 and under retaining slips 60, as shown in FIG. 2.

Each segment 58 bears an informational unit 62 in the form of a sheet 64 carrying one or more pictures 66 or the like information (graphs, charts, written indicia, etc.). A different segment 58 with different pictures 66 or the like can be provided for each pie-shaped area or wheel 44.

For each set of units 62 there is a set of matching captions 68 bearing indicia 70 and releasably securable to each segment 58, as by an adhesive backing 72 or the like. Each caption 68 and each matching unit 62 is coded with the same color, the various captions 68 and units 62 bearing different colors. Thus, in this instance the physical key is color, which aids the students in properly placing individual captions 68 on the correct related units 62.

Device 40 is utilizable in the same manner and has the same advantages as device 10. Moreover, individual segments 58 bearing individual units 62 can be moved easily in and out of the area of main visual attention, during use of device 40 merely by rotating wheel 44 to the desired position. Segments 58 can also be easily removed and reinserted at various locations on wheel 44 in order to build up a desired visual mosaic for maximum interest and knowledge transfer. Device 40 can, of course, be employed with instruction sheets (not shown) and one or more full sets of units 62 and captions 68, as desired, to meet various teaching needs. Thus, device 40 is inexpensive, useful and a substantial improvement over conventional teaching aids.

FIG. 3

Figure 3:
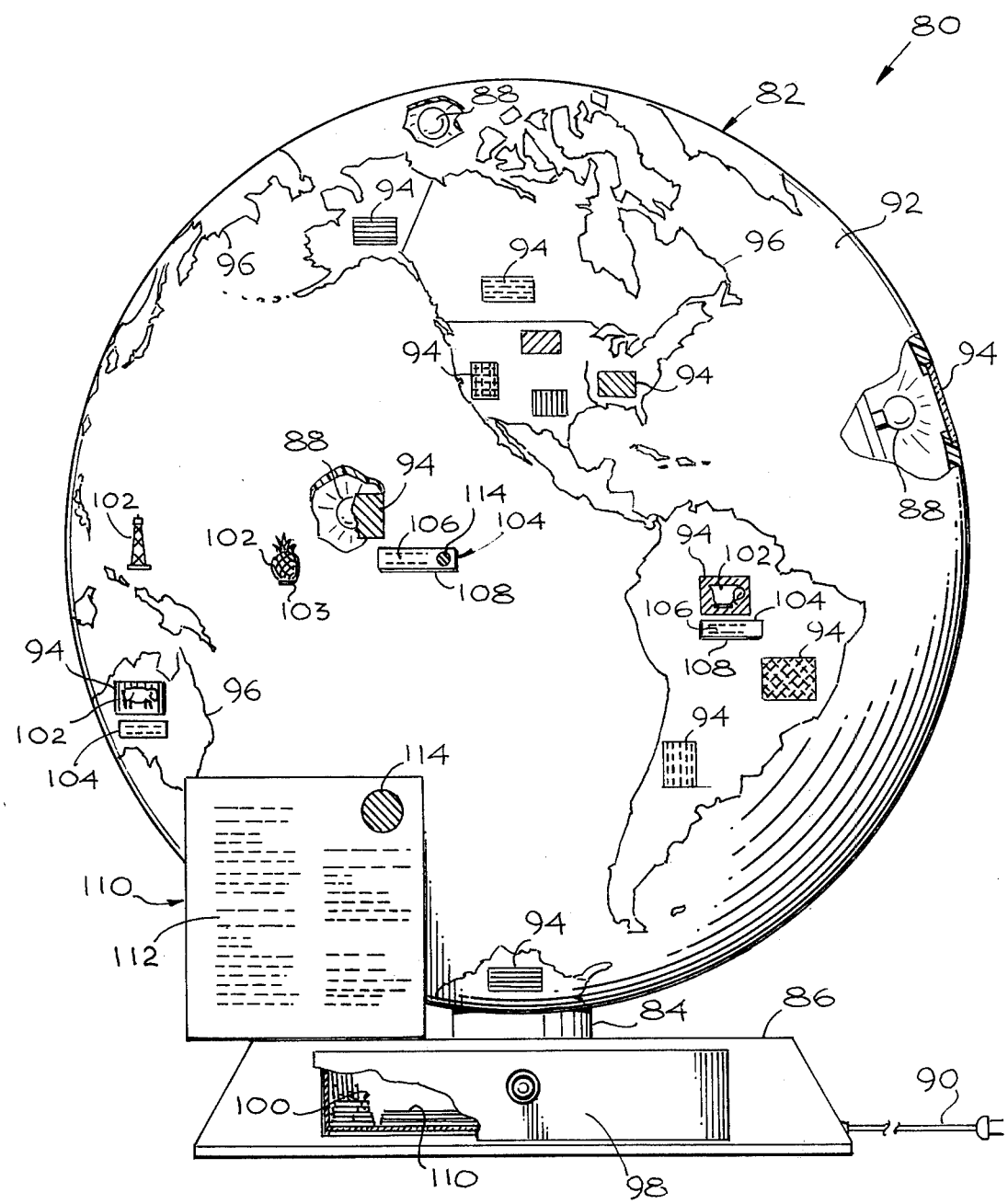

A third preferred embodiment of the invention is schematically depicted in FIG. 3. Thus, FIG. 3 shows a device 80 in the form of a terrestrial globe 82 mounted on upraised post 84 secured to a base 86. Globe 82 is hollow and its interior is supplied with one or more lights 88 connectable through a connector cord 90 to an electrical outlet (not shown). Globe 82 has on its exterior surface 92 a plurality of spaced colored glass windows 94, located in selected areas 96 defined on globe 82, as by outlines 96 of land masses, countries, regions, etc.

Base 86 has a pull-out drawer 98 containing the following: (a) a set of informational units 100 comprising translucent decals 102 of different persons, animals and items, such as sheep, coffee cups, Eskimos, mountains, rivers, etc., and bearing a releasable backing 103; (b) a set of paperboard captions 104 bearing written indicia 106, individual captions 104 relating to individual decals 102 and bearing an adhesive backing 108 for releasably securing to surface 92 of globe 82; and, (c) a set of instruction sheets 110 for the teacher and students to aid in the use of device 80. One such sheet 110 bearing indicia 112 is shown resting on base 86 against globe 82. Sheets 110 and units 100 in a given set each bear a color key 114 which indicates the degree of inherent learning difficulty of each set of units 100. Captions 104 of a given set could also bear such key 114, if desired.

Device 80 is utilizable in generally the same manner and for generally the same purposes as devices 10 and 40. Thus, for example, the teacher can randomly pass out the various decals 102 and captions 104 to members of the class. Those students with decals 102 can then be asked to affix them to the proper windows 94 in the proper outlined areas 96, according to the images on the decals 102. Thus, a decal 102 bearing the image of a sheep may be affixed to the window 94 in the area 96 designated by outline as being Australia. After decals 102 are in their proper places on windows 94, those students with captions 104 can be asked to affix their captions under the proper windows, depending for guidance on the written indicia 106 on the individual captions 104.

A further clue may be given to proper caption placement, as by individually color coding each caption 104 to match the color of the proper window 94, which color is visible through the translucent decal 102 placed thereon.

Lights 88, when turned on, make the color of each window 94 stand out in order to facilitate this color matching step. The color coding of each caption 104 can, if desired, be on the side opposite that bearing indicia 106, and the students can be asked not to refer thereto unless necessary. It will be understood that various other ways can also be devised to most effectively use device 80 in the teaching process.

Device 80 in any event is simple, inexpensive and easy to use. It can be made of any conventional materials, such as plastic, metal, glass, fiberglass, wood, paperboard or the like, providing that windows 94 are colored and transparent, and that decals 102 and captions 104 have the properties indicated above.

Various other embodiments, arrangements and provisions can be made. In this regard, the improved device of the present invention can be modified, changed or altered in its components and/or parameters. All such modifications, changes and alterations as are within the scope of the appended claims form part of the present invention.

What is claimed is:

1. An improved educational teaching device, said device comprising, in combination:
    a. a teaching display board of extended surface area;
    b. at least one set of related units of informational material;
    c. means for releasably securing each of said informational units to and positioning each of said informational units on said board;
    d. at least one set of related captions for each said set of informational material, each said caption bearing a first physical key, and a separate second physical key being disposed on either (a) each said caption, or (b) each said informational unit; and,
    e. means for releasably securing said captions to and repositioning said captions on said board adjacent said information units to signify a relationship therewith.

2. The improved teaching device of claim 1 wherein said informational units comprise three dimensional objects.

3. The improved teaching device of claim 2 wherein said objects are of different shapes and sizes.

4. The improved teaching device of claim 3 wherein said board includes outlined spaces for reception of said objects.

5. The improved teaching device of claim 1 wherein said releasable securing means comprise adhesive backing means, and wherein said board is curved.

6. The improved teaching device of claim 1 wherein each said caption bears at least one physical key for proper correlation of said caption with a selected one of said informational units.

7. The improved teaching device of claim 6 wherein said informational units comprise three dimensional objects.

8. The improved teaching device of claim 7 wherein said one physical key comprises a correlation between the dimension of a given caption and the same dimension of a given unit.

9. The improved teaching device of claim 7 wherein said physical key comprises a correlation between the color of a given caption and that of a given unit.

10. The improved teaching device of claim 7 wherein said physical key comprises a correlation between the shape of a given caption and that of a given unit.

11. The improved teaching device of claim 7 wherein said physical key comprises a correlation between the physical orientation of a given caption and that of a given unit.

12. The improved teaching device of claim 7 wherein said physical key comprises a correlation between the smell of a given caption and that of a given unit.

13. The improved teaching device of claim 6 wherein each second physical key indicates the relative inherent difficulty of making said correlation.

14. The improved teaching device of claim 6 wherein each said informational unit bears a second physical key indicating the relative inherent difficulty of making said correlation.

15. The improved teaching device of claim 1 wherein said device includes a set of instruction sheets for each set of said informational units and wherein each said set of said sheets and each said set of said units bear questions regarding said relationship and a physical key indicating the relative inherent degree of difficulty of correlating said captions with said set of units.

16. The improved teaching device of claim 1 including
    a. a plurality of sub-sets of informational material, and
    b. a plurality of sub-sets of captions, whereby each sub-set of captions relates to a pre-selected sub-set of informational material.

* * * * *